(12) United States Patent
Shotey et al.

(10) Patent No.: US 10,720,727 B1
(45) Date of Patent: Jul. 21, 2020

(54) OUTLET COVER ASSEMBLY WITH ELECTRICAL CONNECTION

(71) Applicant: IBO PARTNERS, LLC, Scottsdale, AZ (US)

(72) Inventors: Michael Shotey, Scottsdale, AZ (US); Marcus Shotey, Scottsdale, AZ (US); Andrew Finch, Scottsdale, AZ (US); David John Zook, Scottsdale, AZ (US)

(73) Assignee: IBO Partners, LLC, Scottsdale, AZ (US)

( * ) Notice: Subject to any disclaimer, the term of this patent is extended or adjusted under 35 U.S.C. 154(b) by 0 days.

(21) Appl. No.: 16/599,007

(22) Filed: Oct. 10, 2019

Related U.S. Application Data

(63) Continuation-in-part of application No. 16/405,189, filed on May 7, 2019, now Pat. No. 10,446,970, which is a continuation of application No. 15/656,935, filed on Jul. 21, 2017, now Pat. No. 10,305,216.

(Continued)

(51) Int. Cl.

| | |
|---|---|
| *H01H 23/04* | (2006.01) |
| *H01R 13/512* | (2006.01) |
| *H02G 3/12* | (2006.01) |
| *H02G 3/14* | (2006.01) |
| *H01R 25/00* | (2006.01) |

(Continued)

(52) U.S. Cl.
CPC ............ *H01R 13/512* (2013.01); *H02G 3/12* (2013.01); *H02G 3/14* (2013.01); *H01H 23/025* (2013.01); *H01H 23/04* (2013.01); *H01R 13/7175* (2013.01); *H01R 25/006* (2013.01)

(58) Field of Classification Search
CPC .. H01R 25/006; H01R 13/7175; H01H 23/04; H01H 23/025
See application file for complete search history.

(56) References Cited

U.S. PATENT DOCUMENTS 5,485,356 A * 1/1996 Nguyen ............... H01R 13/717
174/66
6,000,807 A 12/1999 Moreland
(Continued)

FOREIGN PATENT DOCUMENTS

| | | |
|---|---|---|
| CA | 2902518 | 2/2016 |
| CN | 103474816 | 12/2013 |
| WO | 2015078079 | 6/2015 |

*Primary Examiner* — Tho D Ta
(74) *Attorney, Agent, or Firm* — Schmeiser, Olsen & Watts LLP

(57) ABSTRACT

An outlet cover assembly with electrical connection to couple to a receptacle. The cover assembly may include a cover plate having an electrical load and at least one intermediate connector coupled to the electrical load, an intermediate plate having at least one receptacle connector extending from the intermediate plate and an electrical connection point coupled to the at least one receptacle connector. The receptacle connector may be placed in electrical contact with an electric supply of the receptacle and delivers current to the electrical connection point when coupled to the receptacle. The intermediate plate is coupled between the receptacle and the cover plate with the intermediate connector of the cover plate engaging the electrical connection point of the intermediate plate to supply power to the electrical load coupled to the cover plate.

18 Claims, 11 Drawing Sheets

Related U.S. Application Data

(60) Provisional application No. 62/367,336, filed on Jul. 27, 2017, provisional application No. 62/795,650, filed on Jan. 23, 2019.

(51) Int. Cl.
*H01R 13/717* (2006.01)
*H01H 23/02* (2006.01)

(56) References Cited

U.S. PATENT DOCUMENTS

| | | | |
|---|---|---|---|
| 6,183,101 B1 | 2/2001 | Chien | |
| 6,241,531 B1 * | 6/2001 | Roath | H01R 12/52 439/591 |
| 6,423,900 B1 | 7/2002 | Soules | |
| 7,367,121 B1 * | 5/2008 | Gorman | H01R 13/652 174/53 |
| 7,563,131 B2 | 7/2009 | Sullivan et al. | |
| 7,654,855 B2 | 2/2010 | Liao | |
| 8,304,652 B2 | 11/2012 | McBain | |
| 8,456,131 B2 | 6/2013 | Bukow | |
| 8,668,347 B2 * | 3/2014 | Ebeling | H01R 13/5213 362/95 |
| 8,912,442 B2 | 12/2014 | Smith | |
| 9,035,180 B2 | 5/2015 | Smith et al. | |
| 9,035,181 B2 * | 5/2015 | Smith | H05K 5/03 174/66 |
| 9,124,105 B2 | 9/2015 | Gunderman et al. | |
| 9,208,965 B2 | 12/2015 | Busby et al. | |
| 9,252,610 B2 | 2/2016 | Chen et al. | |
| 9,362,728 B2 * | 6/2016 | Smith | H02G 3/14 |
| 9,464,795 B2 * | 10/2016 | Ebeling | H01R 13/5213 |
| 9,490,649 B2 | 11/2016 | Moore | |
| 9,520,671 B2 | 12/2016 | Misener | |
| 9,564,725 B1 * | 2/2017 | Moss | H01H 23/04 |
| 9,732,921 B2 | 8/2017 | Chien | |
| 9,742,111 B2 * | 8/2017 | Smith | H02G 3/14 |
| 9,755,374 B1 | 9/2017 | St. Laurent et al. | |
| 9,768,562 B2 | 9/2017 | Smith et al. | |
| 9,768,564 B2 | 9/2017 | Read et al. | |
| 9,774,154 B2 | 9/2017 | St. Laurent et al. | |
| 9,787,025 B2 | 10/2017 | Smith et al. | |
| 9,807,829 B2 | 10/2017 | Jensen | |
| 9,832,841 B2 | 11/2017 | Knight et al. | |
| 9,839,099 B2 | 12/2017 | Lark, Jr. et al. | |
| 9,871,324 B2 | 1/2018 | Smith et al. | |
| 9,882,318 B2 | 1/2018 | Smith et al. | |
| 9,882,361 B2 | 1/2018 | Smith et al. | |
| 9,899,814 B2 | 2/2018 | Smith et al. | |
| 9,917,430 B2 | 3/2018 | Smith et al. | |
| 9,935,440 B1 | 4/2018 | Szeto et al. | |
| 9,941,183 B2 | 4/2018 | Read et al. | |
| 10,291,007 B2 * | 5/2019 | Smith | H02G 3/14 |
| 10,468,834 B2 * | 11/2019 | Diotte | H01R 13/748 |
| 2008/0062013 A1 | 3/2008 | Face et al. | |
| 2016/0268071 A1 | 9/2016 | Thomas et al. | |
| 2017/0013736 A1 | 1/2017 | Ebeling | |
| 2017/0025886 A1 | 1/2017 | Rohmer et al. | |
| 2017/0214201 A1 | 6/2017 | Armstrong et al. | |
| 2017/0251289 A1 | 8/2017 | Ebeling et al. | |
| 2017/0256927 A1 | 9/2017 | Padilla et al. | |
| 2017/0264059 A1 | 9/2017 | Cote | |
| 2017/0273203 A1 | 9/2017 | Iaconis | |
| 2017/0331231 A1 | 11/2017 | Ng | |
| 2018/0048099 A1 | 2/2018 | Diotte | |

* cited by examiner

OUTLET COVER ASSEMBLY WITH ELECTRICAL CONNECTION

CROSS-REFERENCE TO RELATED APPLICATIONS

This application is a continuation-in-part of U.S. patent application Ser. No. 16/405,189, filed on May 7, 2019, which is a continuation of U.S. patent application Ser. No. 15/656,935, filed on Jul. 21, 2017, now U.S. Pat. No. 10,305,216, which claims the benefit of U.S. Provisional Patent No. 62/367,336, filed on Jul. 27, 2016, and this application claims the benefit of U.S. Provisional Application No. 62/795,650, filed on Jan. 23, 2019, the disclosures of which are hereby incorporated herein by this reference.

TECHNICAL FIELD

Aspects of this document relate generally to covering an outlet, and more specifically to an electrical outlet cover assembly with an intermediate plate having electrical connectivity to the outlet coupled between a cover plate having an electrical load and the outlet for drawing power for the electrical load from the outlet through the intermediate plate.

BACKGROUND

Electrical outlets come in a variety of shapes and colors. When a homeowner desires to change the color of an electrical outlet, however, it is conventionally a tedious and expensive process.

Conventional electrical outlets are made of several components, including a wall box and an outlet (also called a receptacle), which is typically composed of pairs of sockets and a yoke. The outlet receptacle is typically attached to the wall box that is typically attached to a framing member inside the wall, and is accessible through a hole cut in the wall. A cover plate having apertures to allow the sockets to protrude is installed over these components, typically with one or two screws. Electrical devices are plugged in by inserting the plug blades through aligned apertures in the cover plate and socket.

A cover plate is installed after construction. It is a common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle.

Cover plates are now available that can draw power from the outlets, typically by utilizing screws conventionally located on the sides of the receptacle. The cover plates include a connector and a load, such as a light coupled to a back of the outlet cover, wherein the connectors contact at least one screw on each side of the outlet receptacle.

These existing cover plates have limitations, especially in installation ensuring that the contacts indeed engage the side terminal screws of an outlet. Accordingly, there is a need for an improved outlet cover assembly with electrical connection.

SUMMARY

An embodiment includes an outlet cover assembly with electrical connection to couple to a receptacle, the assembly comprising: a cover plate with an electrical outlet opening sized to receive a receptacle face of the receptacle therethrough, the cover plate comprising an electrical load and at least one intermediate connector coupled to the electrical load; and an intermediate plate with an electrical outlet opening sized to receive the receptacle face therethrough, the intermediate plate comprising at least one and receptacle connector extending from the intermediate plate and an electrical connection point coupled to the at least one receptacle connector, wherein the receptacle connector is placed in electrical contact with an electric supply of the receptacle and delivers current to the electrical connection point when coupled to the receptacle; and wherein the intermediate plate is coupled between the receptacle and the cover plate with the receptacle face extending through the outlet opening of the intermediate plate and the cover plate and with the intermediate connector of the cover plate engaging the electrical connection point of the intermediate plate to supply power to the electrical load coupled to the cover plate.

Another embodiment includes a method of using an outlet cover assembly with electrical connection to couple to an outlet receptacle, the method comprising: connecting a receptacle connector extending from an intermediate plate to an electrical supply of the outlet receptacle in response to coupling an intermediate plate to the outlet receptacle; coupling a cover plate to the outlet receptacle, wherein the intermediate plate is coupled between the cover plate and the outlet receptacle when the cover plate is coupled to the outlet receptacle; and supplying power to an electrical load.

Another embodiment includes an outlet cover assembly with electrical connection to couple to a receptacle, the assembly comprising: a cover plate with an electrical outlet opening sized to receive a receptacle face of the receptacle therethrough, the cover plate comprising an electrical load coupled to a first intermediate connector and a second intermediate connector; and an intermediate plate with an electrical outlet opening sized to receive the receptacle face therethrough, the intermediate plate comprising a first receptacle connector and a second receptacle extending from the intermediate plate and a first electrical connection point coupled to the first receptacle connector and a second electrical connection point coupled to the second receptacle connector, wherein the first receptacle connector is coupled to a side terminal screw on one side of the receptacle and the second receptacle connector is coupled to a side terminal screw on an opposing side of the receptacle and delivers current to the first and second electrical connection points when the intermediate plate is coupled to the receptacle; and wherein the intermediate plate is coupled between the receptacle and the cover plate with the receptacle face extending through the outlet opening of the intermediate plate and the cover plate and with the first and second intermediate connectors of the cover plate engaging the first and second electrical connection points of the intermediate plate respectively to supply power to the electrical load coupled to the cover plate.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DETAILED DESCRIPTION

Figure 1:
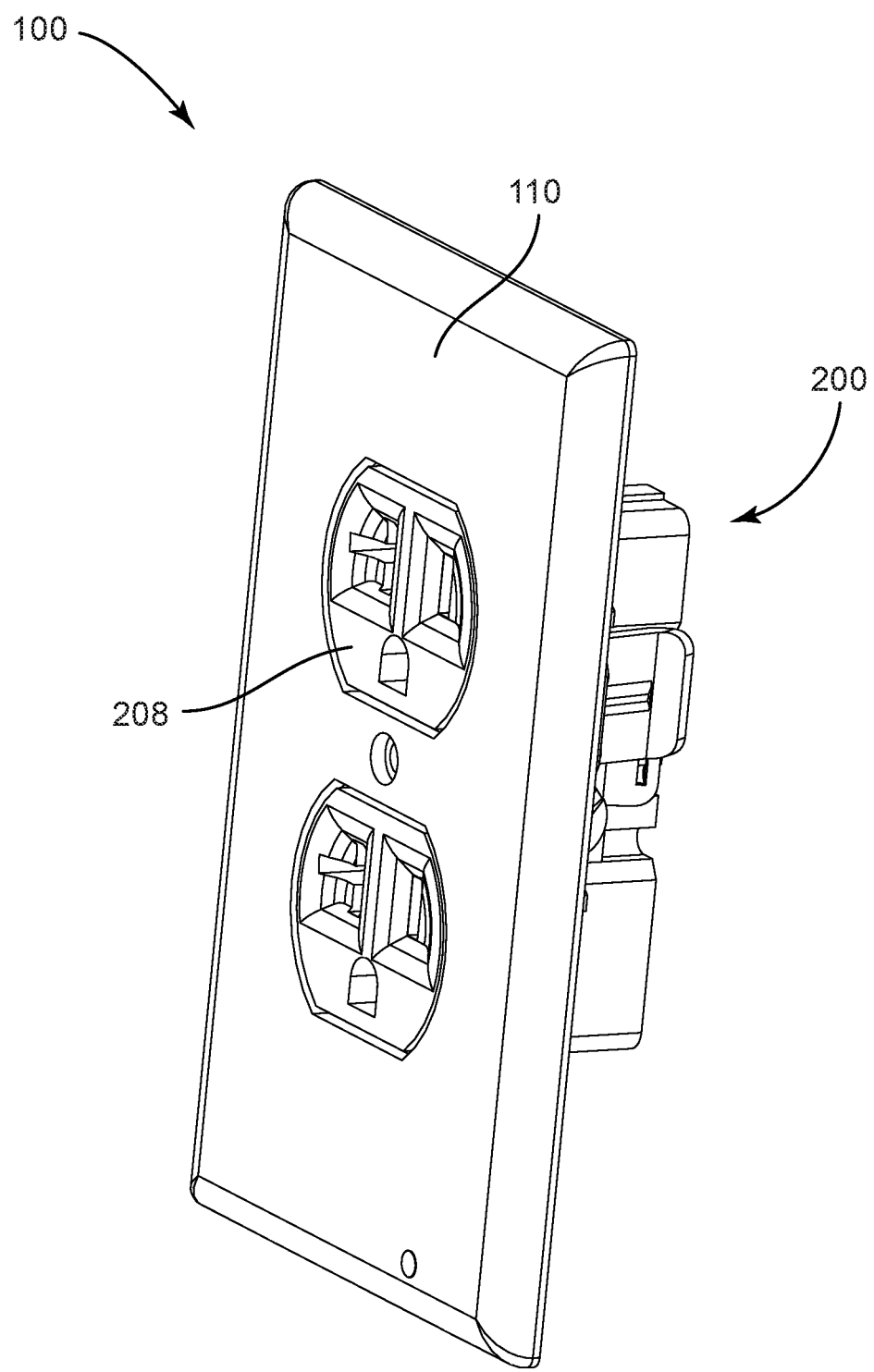
FIG. 1 shows a perspective view of an outlet cover assembly coupled to an outlet receptacle in accordance with an embodiment.
Figure 2:
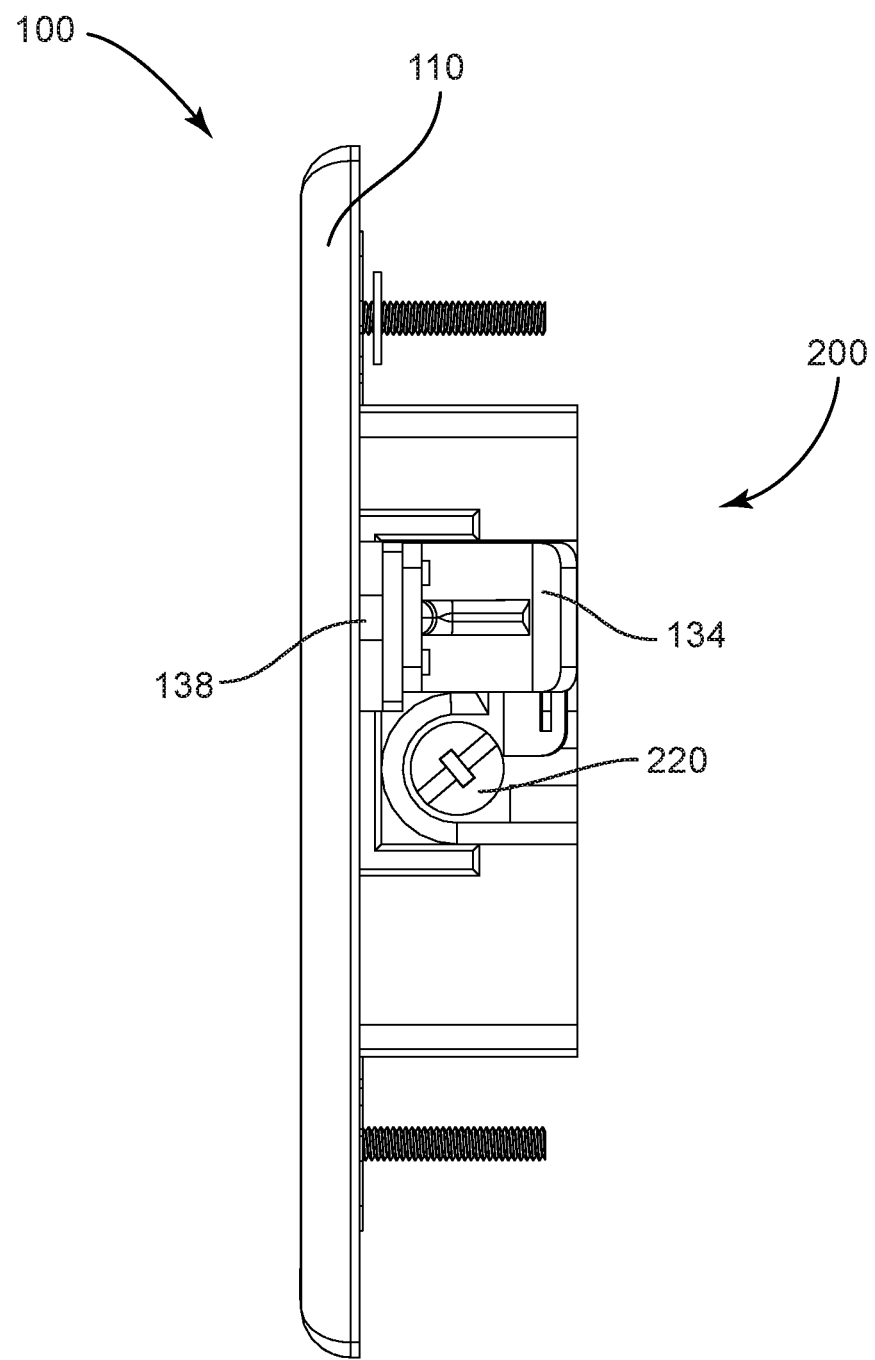
FIG. 2 shows a side view of an outlet cover assembly coupled to an outlet receptacle in accordance with an embodiment.
Figure 3:
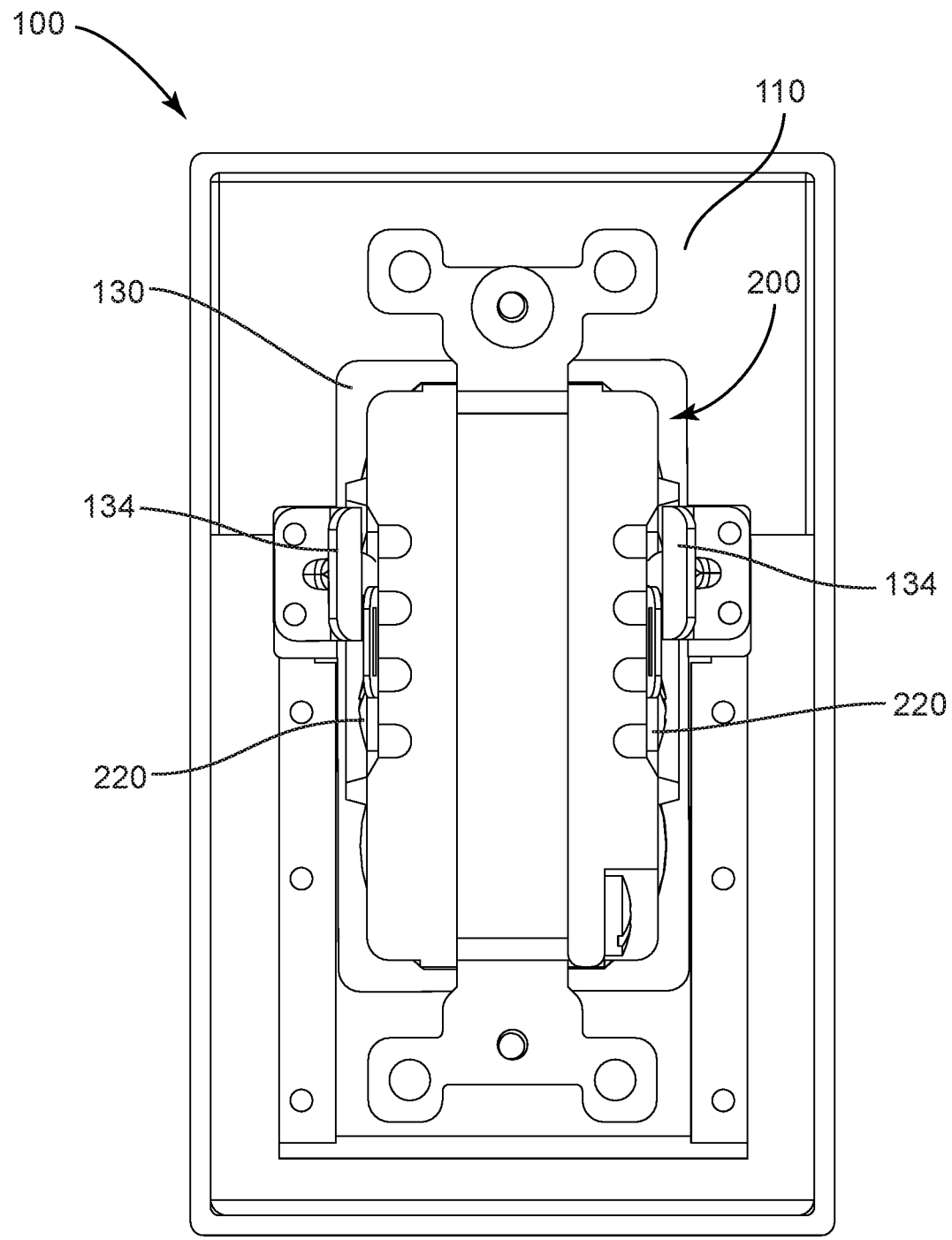
FIG. 3 shows a rear view of an outlet cover assembly coupled to an outlet receptacle in accordance with an embodiment.

There is a growing desire of homeowners to have an outlet cover that can also supply power for other uses, such as a light emanating from the outlet, a USB port and the like while still maintaining access to the outlet itself to plug in other electrical devices.

This disclosure, its aspects and implementations, are not limited to the specific face plate or material types, or other system component examples, or methods disclosed herein. Many additional components, manufacturing and assembly procedures known in the art consistent with face plate manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example" or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The present disclosure relates to an electrical outlet cover assembly with an intermediate plate having electrical connectivity to the outlet coupled between a cover plate having an electrical load and the outlet for drawing power for the electrical load from the outlet through the intermediate plate.

Figure 4:
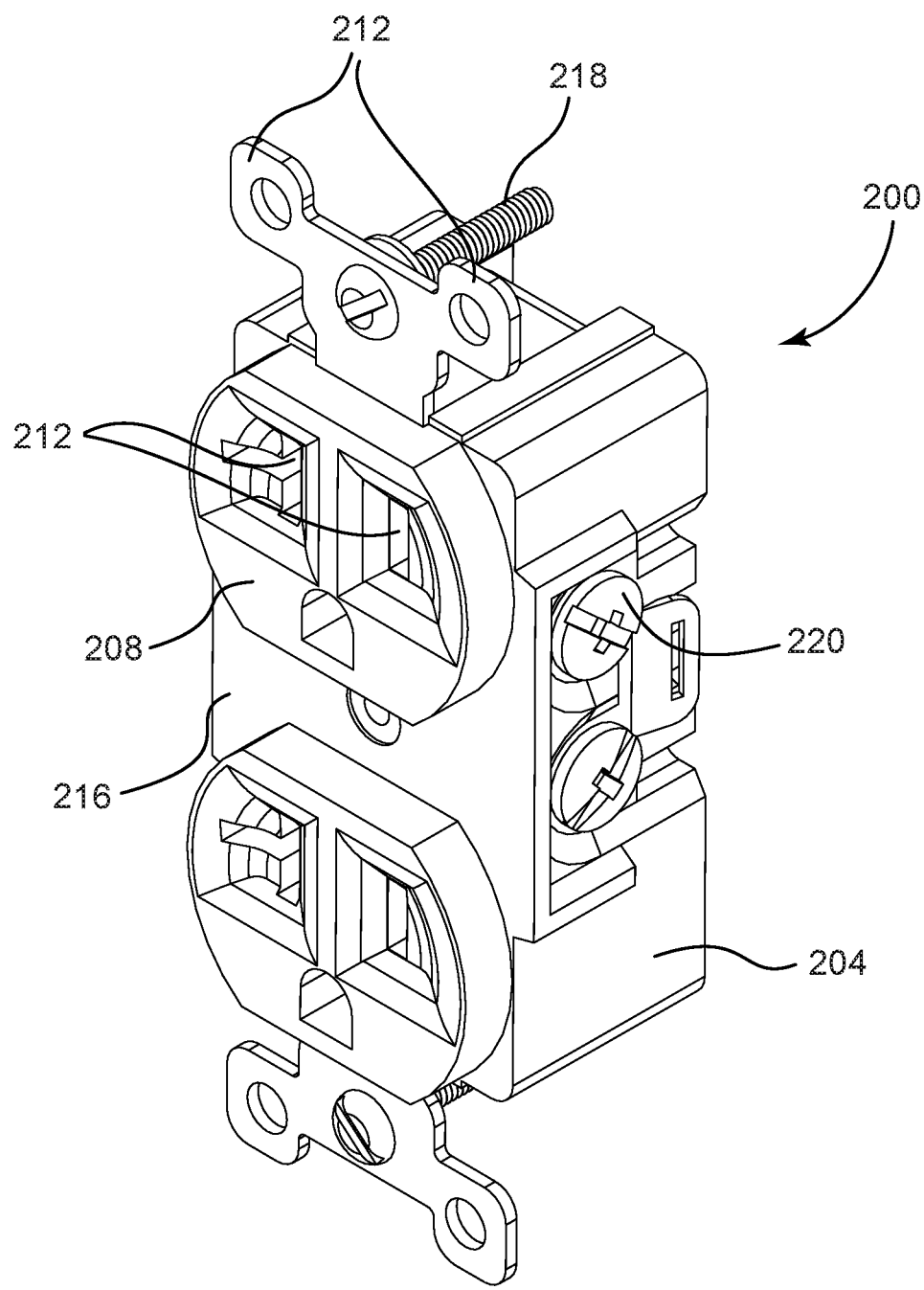
FIG. 4 shows a perspective view of an outlet receptacle in accordance with an embodiment.
Figure 5A:
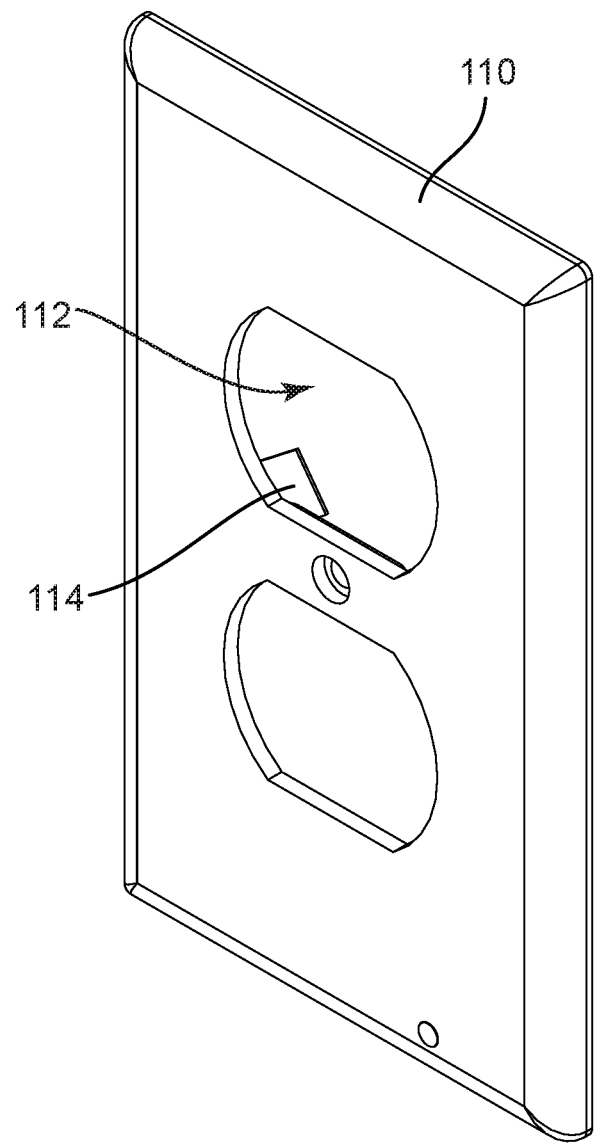
FIG. 5A shows a perspective view of a cover plate of an outlet cover assembly in accordance with an embodiment.
Figure 5B:
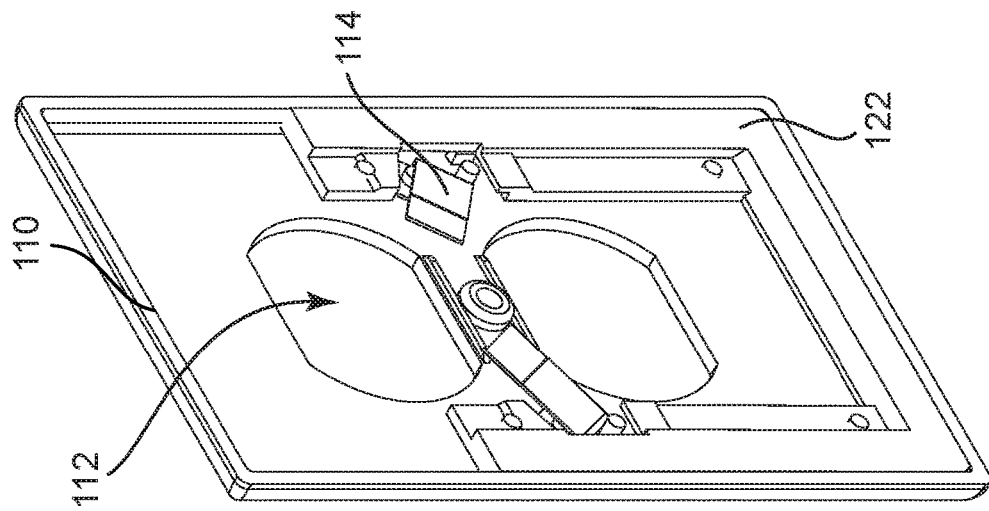
FIG. 5B shows a rear perspective view of a cover plate of an outlet cover assembly in accordance with an embodiment.
Figure 5C:
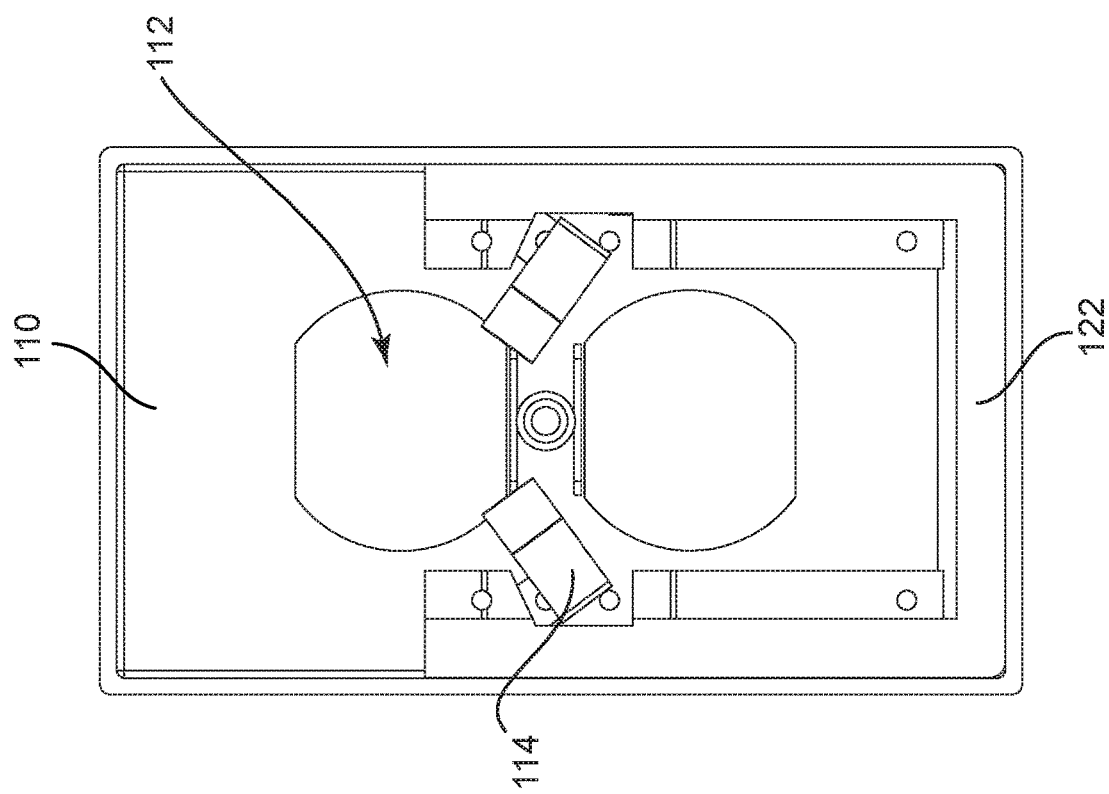
FIG. 5C shows a rear view of a cover plate of an outlet cover assembly in accordance with an embodiment.
Figure 5D:
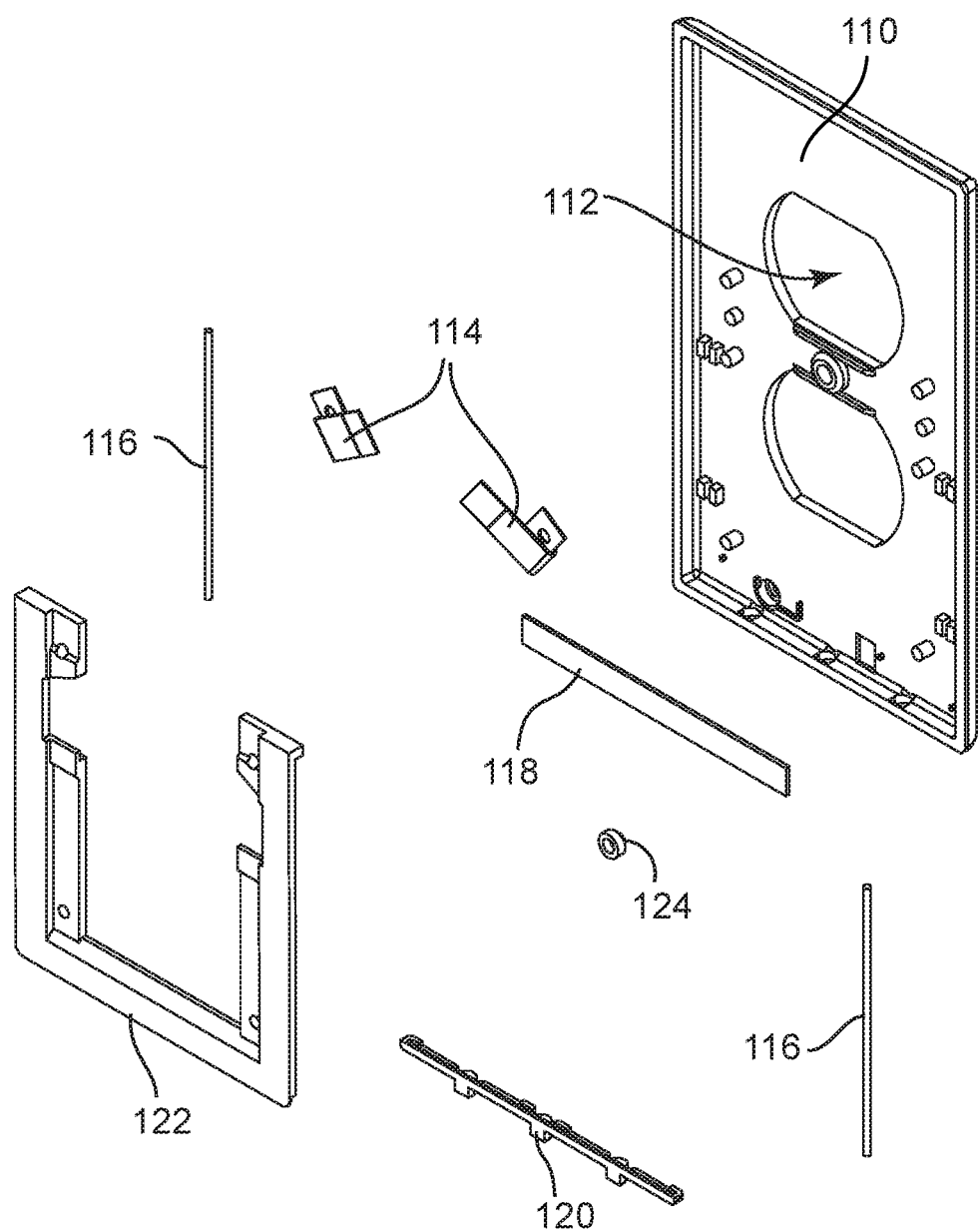
FIG. 5D shows an exploded perspective view of a cover plate of an outlet cover assembly in accordance with an embodiment.
Figure 6A:
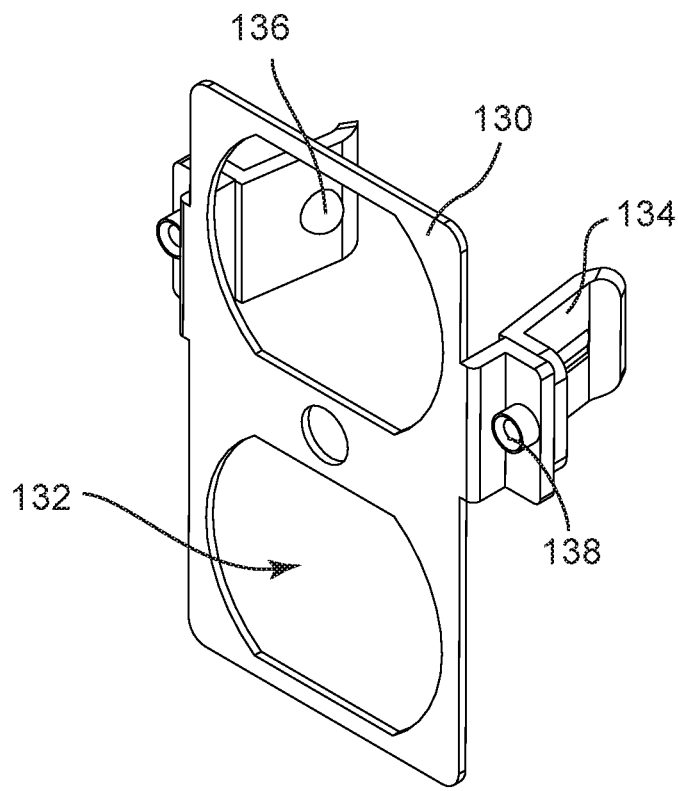
FIG. 6A shows a perspective view of an intermediate plate of an outlet cover assembly.
Figure 6B:
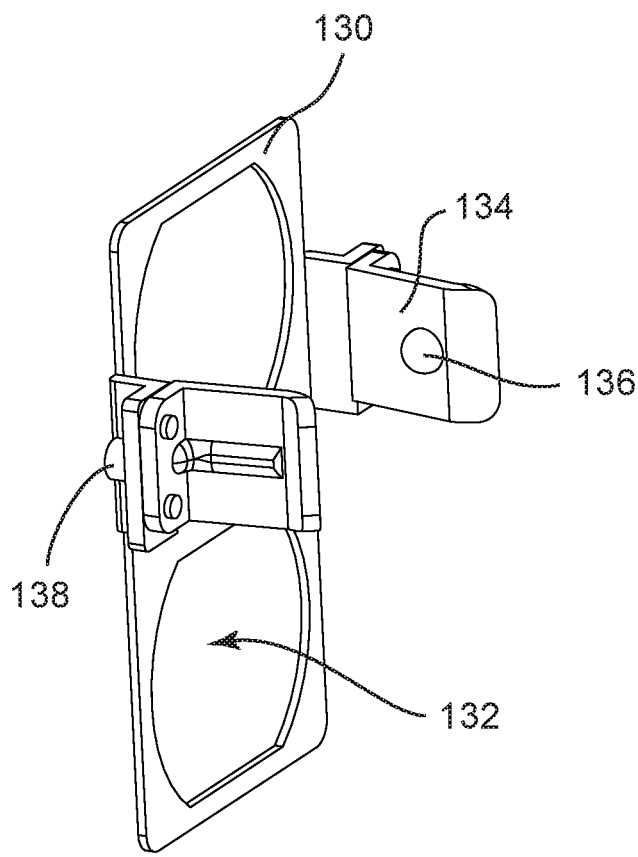
FIG. 6B shows a rear perspective view of an intermediate plate of an outlet cover assembly.
Figure 7:
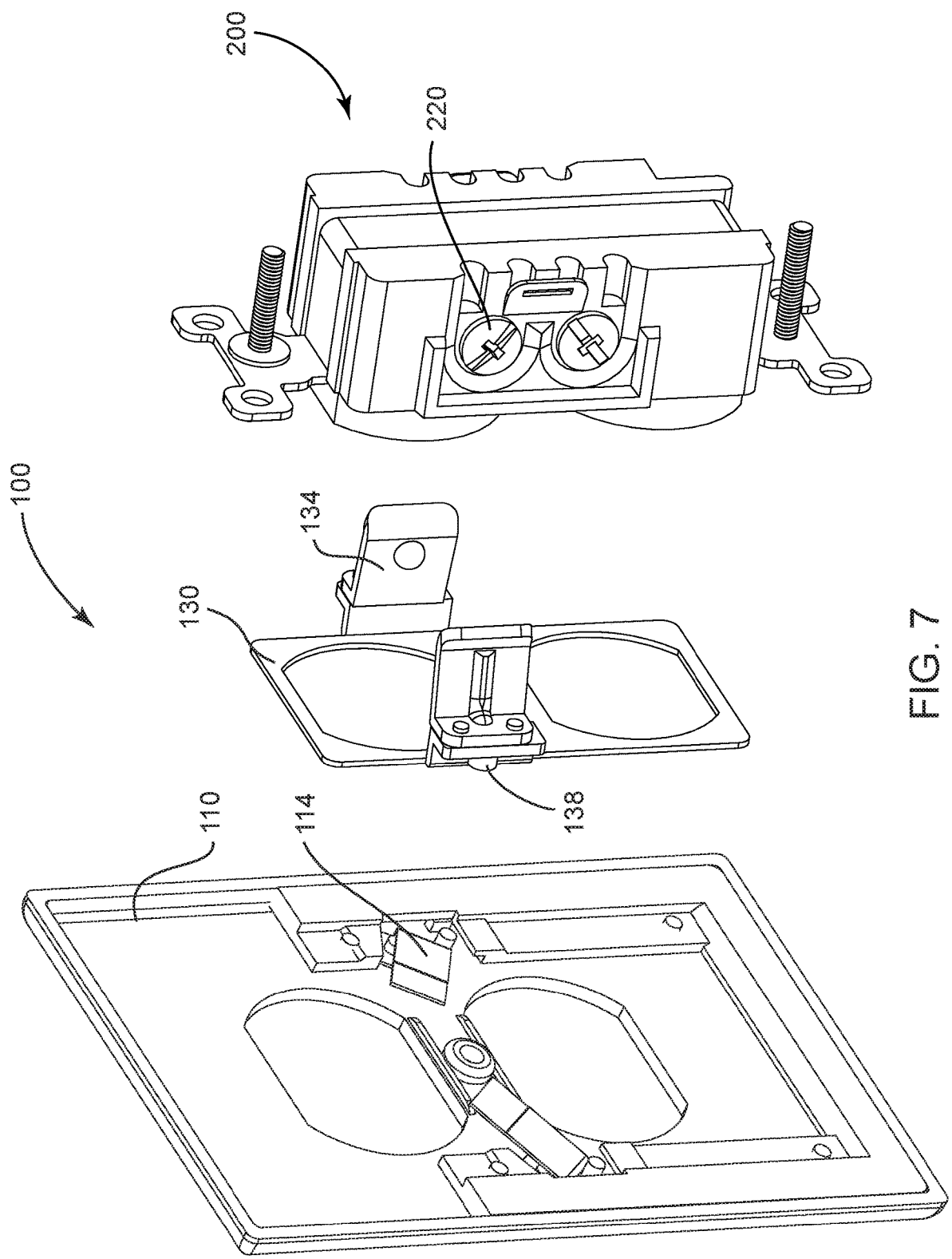
FIG. 7 shows an exploded perspective view of an outlet cover assembly and an outlet receptacle in accordance with an embodiment.

For example, FIGS. 1-6B show various views a first non-limiting embodiment of an electrical outlet cover assembly or outlet cover assembly 100 coupled to an outlet receptacle 200. The outlet receptacle 200 (as shown in FIG. 4) is a typical receptacle having a receptacle face 208 extending from a base 216, wherein outlet apertures 210 are located on the receptacle face to allow a plug to engage with the receptacle 200. The receptacle 200 may further include a yoke 212 and a be mounted to a wall with a mounting screw 218. The receptacle 200 further includes side terminal screws 220 extending from a side 204 of the receptacle 200.

Figure 8:
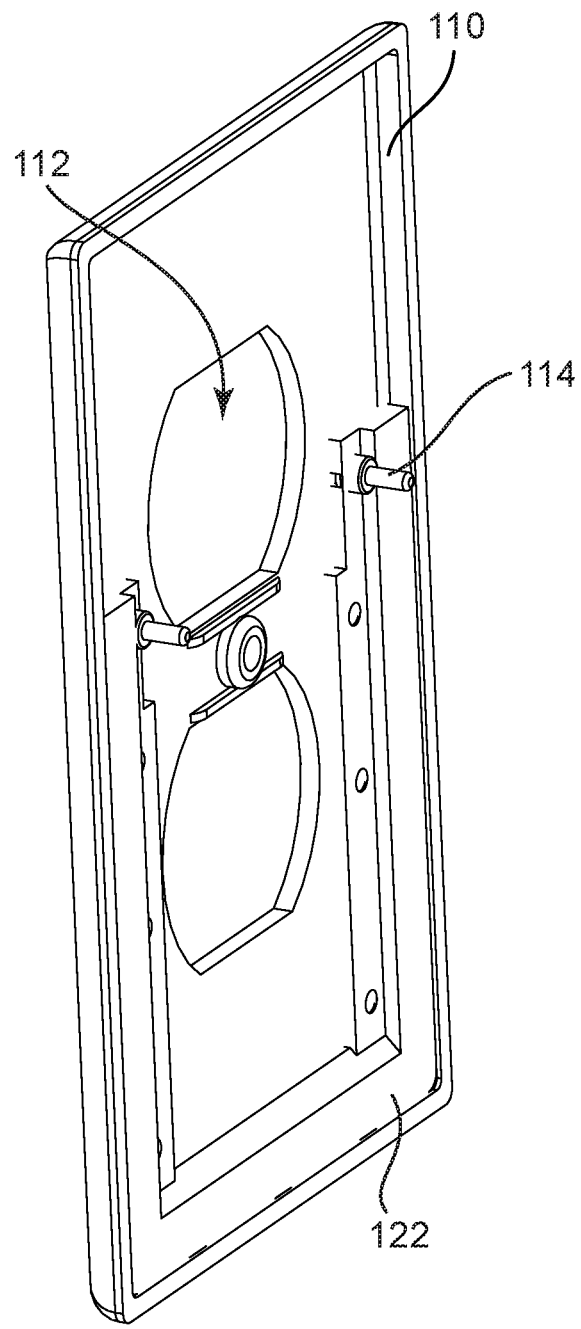
FIG. 8 shows an alternative perspective view of a cover plate of an outlet cover assembly in accordance with an embodiment.

An electrical outlet cover assembly 100 comprises a cover plate 110 and an intermediate plate 130. With reference to FIGS. 1-3 and 5A-5D, the cover plate 110 further comprises at least one electrical outlet opening 112 or outlet opening 112 sized to receive the receptacle face 208 therethrough. The cover plate 110 may further includes intermediate connectors 114, wherein the intermediate connectors may be a leaf spring contact as depicted in FIGS. 5A-5D or other type of contact, such as, but not limited to, a spring-loaded contact (See FIG. 8). The intermediate connectors 114 may be coupled to electrical wire 116 that is connected to a circuit board 118 such as a printed circuit board. The cover plate 110 may also include an electrical load 120 coupled to the circuit board 118. A back cover 122 may be coupled to the back side of the cover plate 110 and retains the electrical wire 116, circuit board 118 and electrical load 120 between the back cover 122 and the back side of the cover plate 110. The intermediate connectors 114 are not covered by the back cover 122 to allow the intermediate connectors to electrically couple to the intermediate plate 130. An optional component of the cover plate 110 may be a light sensor 124, wherein as the light dims the sensor 124 operates as a switch to complete a circuit connection to allow electricity to flow to the electrical load 120.

Figure 9:
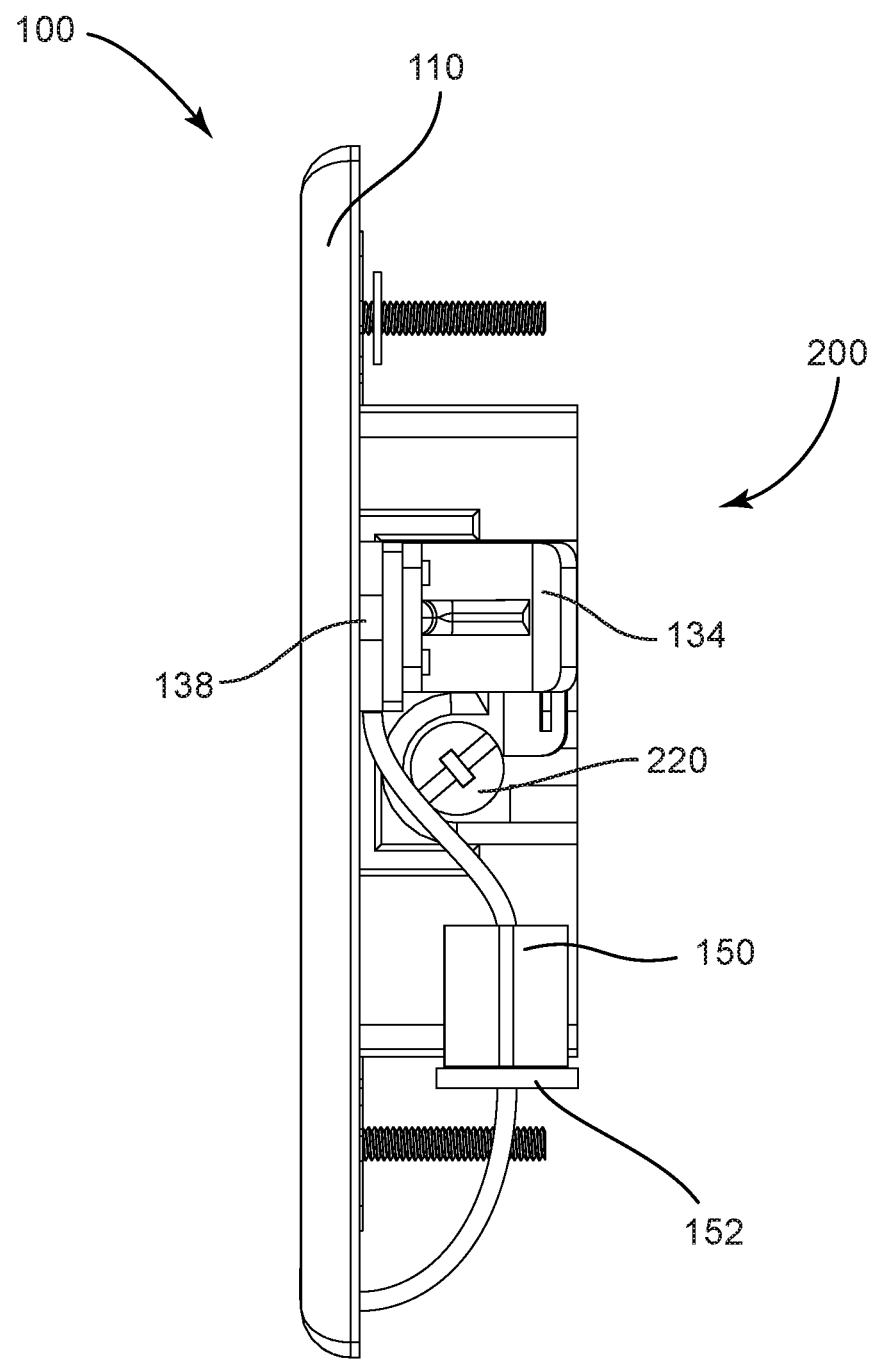
FIG. 9 shows a side view of an outlet cover assembly coupled to an outlet receptacle in accordance with an embodiment.

With reference to FIGS. 1-3 and 6A-6B, the intermediate plate 130 further comprises at least one electrical outlet opening 132 or outlet opening 132 sized to receive the receptacle face 208 therethrough. The intermediate plate 130 may further comprise at least one receptacle connector 134 having a contact 136 extending from the intermediate plate 130 and an electrical connection point 138 coupled to the at least one receptacle connector 134. The electrical connection point 138 of the intermediate plate 130 may be any time any type of connection point, such as, but not limited to a spring-loaded pin connector. In some embodiments, such as that depicted in FIG. 9, a connector between the intermediate plate 130 and the electrical load may include a wire and wire harness forming a first connector 150 coupled to and electrically connected to the receptacle connector 134 and wire and wire harness forming a second connector 152 coupled to and electrically connected to the electrical load, wherein the first connector 150 is releasably coupled to the second connector 152. This establishes an electrical connection from the receptacle connector 134 an the electrical load. The receptacle connector 134 may be a flexible connector that is configured to couple to an electric supply, such as, but not limited to side terminal screws 220. In those embodiments, the receptacle connector is biased toward the side terminal screws 220 when the intermediate plate 130 is coupled to the outlet receptacle 200. This allows the contact 136 to maintain contact with one of the side terminal screws 220.

Referring further to FIGS. 1-3 and 7 the cover assembly 100 may be coupled to the outlet receptacle 200. In doing so, the intermediate plate 130 is coupled to the outlet receptacle 200 between the receptacle 200 and the cover plate 110 with the receptacle face 208 extending through the outlet opening 132 of the intermediate plate 130 and outlet opening 112 of the cover plate 110. The receptacle connector 134 is placed in electrical contact with an electric supply of the receptacle 200 and delivers current to the electrical connection point 138 when coupled to the receptacle 200. For example, and without limitation, the receptacle connector 134 is coupled to a side terminal screw 220, wherein the side terminal screw 220 is an electric supply. In certain embodiments, the intermediate plate 130 includes two receptacle connectors 134 on each side of the intermediate plate 130 to engage side terminal screws 220 extending from each side of the receptacle 200. The receptacle connector 134 is electrically connected to the electrical connection point 138.

The cover plate 110 may be coupled to the receptacle 200 with the intermediate plate 130 is coupled between the outlet receptacle 200 and the cover plate 110. The intermediate connector 114 of the cover plate 110 engages the electrical connection point 138 of the intermediate plate 130 to supply power to the electrical load 120 coupled to the cover plate 110. The electrical load may include a light, a USB port or the like.

In operation, the invention may include a method of using an outlet cover assembly 100 with electrical connection to couple to an outlet receptacle 200. The method may include connecting a receptacle connector extending from an intermediate plate to an electrical supply of the outlet receptacle in response to coupling an intermediate plate to the outlet receptacle; coupling a cover plate to the outlet receptacle, wherein the intermediate plate is coupled between the cover plate and the outlet receptacle when the cover plate is coupled to the outlet receptacle; and supplying power to an electrical load.

In the method, the step of supplying power to an electrical load may comprise connecting an intermediate connector of the cover plate to an electrical connection point of the intermediate plate; and supplying power from the side terminal of the outlet receptacle to an electrical load of the cover plate that is coupled to the intermediate connector.

In the method, the step of connecting the receptacle connector extending from an intermediate plate to the electrical supply of the outlet receptacle comprises coupling the receptacle connector to a side terminal screw of the outlet receptacle. Further, in the method, the step of coupling the receptacle connector to a side terminal screw of the outlet receptacle comprises flexing the receptacle connector to contact a head of the side terminal screw, wherein the receptacle connector is biased toward the side terminal screw to maintain contact.

As previously described, the electrical connection point 138 of the intermediate plate 130 may be a spring-loaded pin connector and the intermediate connector 114 of the cover plate 110 is a leaf spring contact, wherein connecting the intermediate connector 114 of the cover plate 110 to the electrical connection point 138 of the intermediate plate 130 comprises the leaf spring contact biased toward the spring-loaded pin and the spring-loaded pin biased toward the leaf spring to maintain contact between the leaf spring contact and the spring-loaded pin. The method may also include supplying power to an external device coupled to the USB connector.

It will be understood that the embodiments disclosed are not limited to the specific components disclosed herein, as virtually any components consistent with the intended operation of a method and/or system implementation for such an embodiment may be used. Accordingly, for example, although particular component examples may be disclosed, such components may be comprised of any shape, size, style, type, model, version, class, grade, measurement, concentration, material, weight, quantity, and/or the like consistent with the intended purpose, method and/or system of implementation.

In places where the description above refers to particular implementations or embodiments, it should be readily apparent that a number of modifications may be made without departing from the scope and/or spirit thereof and that these principles and modifications may be applied to other such embodiments. The present disclosure is to be considered as an exemplification of the principles of the disclosed methods, apparatus, and systems. The presently-disclosed implementations are, therefore, to be considered in all respects as illustrative, and not intended to limit the broad aspect of the disclosed concepts to the embodiments illustrated. Many additional components and manufacturing and assembly procedures known in the art or consistent with face plates and outlet cover assemblies are contemplated for use with particular implementations in this disclosure. For example, although particular implementations are disclosed, such implementations and implementing components may comprise any components, models, types, materials, versions, quantities, and/or the like as is known in the art for such systems and implementing components, consistent with the intended operation. In places where the description above refers to particular implementations of face plates and outlet cover assemblies, it should be readily apparent that a number of modifications may be made without departing from the spirit thereof. All changes that come within the meaning of and range of equivalency of the description are intended to be embraced therein.

The invention claimed is:

1. An outlet cover assembly with electrical connection to couple to a receptacle, the assembly comprising:
    a cover plate with an electrical outlet opening sized to receive a receptacle face of the receptacle therethrough, the cover plate comprising an electrical load and at least one intermediate connector coupled to the electrical load, wherein the intermediate connector of the cover plate is a leaf spring contact;
    an intermediate plate with an electrical outlet opening sized to receive the receptacle face therethrough, the intermediate plate comprising at least one receptacle connector extending from the intermediate plate and an electrical connection point coupled to the at least one receptacle connector, wherein the receptacle connector is placed in electrical contact with an electric supply of the receptacle and delivers current to the electrical connection point when coupled to the receptacle; and
    wherein the intermediate plate is coupled between the receptacle and the cover plate with the receptacle face extending through the outlet opening of the intermediate plate and the outlet opening of the cover plate and with the intermediate connector of the cover plate engaging the electrical connection point of the intermediate plate to supply power to the electrical load coupled to the cover plate; and
    a back cover coupled to a back side of the cover plate.

2. The assembly of claim 1, wherein the electrical connection point of the intermediate plate is a spring-loaded pin connector.

3. The assembly of claim 1 wherein the electrical load is at least one LED light.

4. The assembly of claim 1, wherein the electrical load is a USB connector.

5. The assembly of claim 1, wherein the at least one receptacle connector is coupled to a side terminal screw of the receptacle.

6. The assembly of claim 5, wherein the at least one receptacle connector is a flexible biased connector.

7. A method of using an outlet cover assembly with electrical connection to couple to an outlet receptacle, the method comprising:
    connecting a receptacle connector extending from an intermediate plate to an electrical supply of the outlet receptacle in response to coupling the intermediate plate to the outlet receptacle;
    coupling a cover plate to the outlet receptacle, wherein the intermediate plate is coupled between the cover plate and the outlet receptacle when the cover plate is coupled to the outlet receptacle;
    supplying power to an electrical load comprising connecting an intermediate connector of the cover plate to an electrical connection point of the intermediate plate, wherein the intermediate connector of the cover plate is a leaf spring contact; and
    coupling a back cover to a back side of the cover plate.

8. The method of claim 7, wherein the electrical load is at least one LED light further comprising illuminating the LED light in response to supplying power to the LED light from the outlet receptacle.

9. The method of claim 7, wherein the electrical load is a USB connector, further comprising connecting an external device to the USB connector.

10. The method of claim 7, wherein supplying power to an electrical load comprises:
    supply power from a side terminal of the outlet receptacle to an electrical load of the cover plate that is coupled to the intermediate connector.

11. The method of claim 10, wherein connecting the receptacle connector extending from an intermediate plate to the electrical supply of the outlet receptacle comprises coupling the receptacle connector to a side terminal screw of the outlet receptacle.

12. The method of claim 11, wherein coupling the receptacle connector to the side terminal screw of the outlet receptacle comprises flexing the receptacle connector to contact a head of the side terminal screw, wherein the receptacle connector is biased toward the side terminal screw to maintain contact.

13. The method of claim 10, wherein the electrical connection point of the intermediate plate is a spring-loaded pin connector.

14. The method of claim 13, wherein connecting the intermediate connector of the cover plate to the electrical connection point of the intermediate plate comprises the leaf spring contact biased toward the spring-loaded pin and the spring-loaded pin biased toward the leaf spring to maintain contact between the leaf spring contact and the spring-loaded pin.

15. An outlet cover assembly with electrical connection to couple to a receptacle, the assembly comprising:
    a cover plate with an electrical outlet opening sized to receive a receptacle face of the receptacle therethrough, the cover plate comprising an electrical load coupled to a first intermediate connector and a second intermediate connector, wherein the first intermediate connector and the second intermediate connector of the cover plate are each a leaf spring contact; and
    an intermediate plate with an electrical outlet opening sized to receive the receptacle face therethrough, the intermediate plate comprising a first receptacle connector and a second receptacle connector extending from the intermediate plate and a first electrical connection point coupled to the first receptacle connector and a second electrical connection point coupled to the second receptacle connector, wherein the first receptacle connector is coupled to a side terminal screw on one side of the receptacle and the second receptacle connector is coupled to a side terminal screw on an opposing side of the receptacle and delivers current to the first and second electrical connection points when the intermediate plate is coupled to the receptacle;

wherein the intermediate plate is coupled between the receptacle and the cover plate with the receptacle face extending through the outlet opening of the intermediate plate and the outlet opening of the cover plate and with the first and second intermediate connectors of the cover plate engaging the first and second electrical connection points of the intermediate plate respectively to supply power to the electrical load coupled to the cover plate; and a back cover coupled to a back side of the cover plate.

16. The assembly of claim 15, wherein the electrical connection point of the intermediate plate is a spring-loaded pin connector.

17. The assembly of claim 15, wherein the electrical load is at least one LED light.

18. The assembly of claim 15, wherein the electrical load is a USB connector.

\* \* \* \* \*